United States Patent Office 3,334,847
Patented Aug. 8, 1967

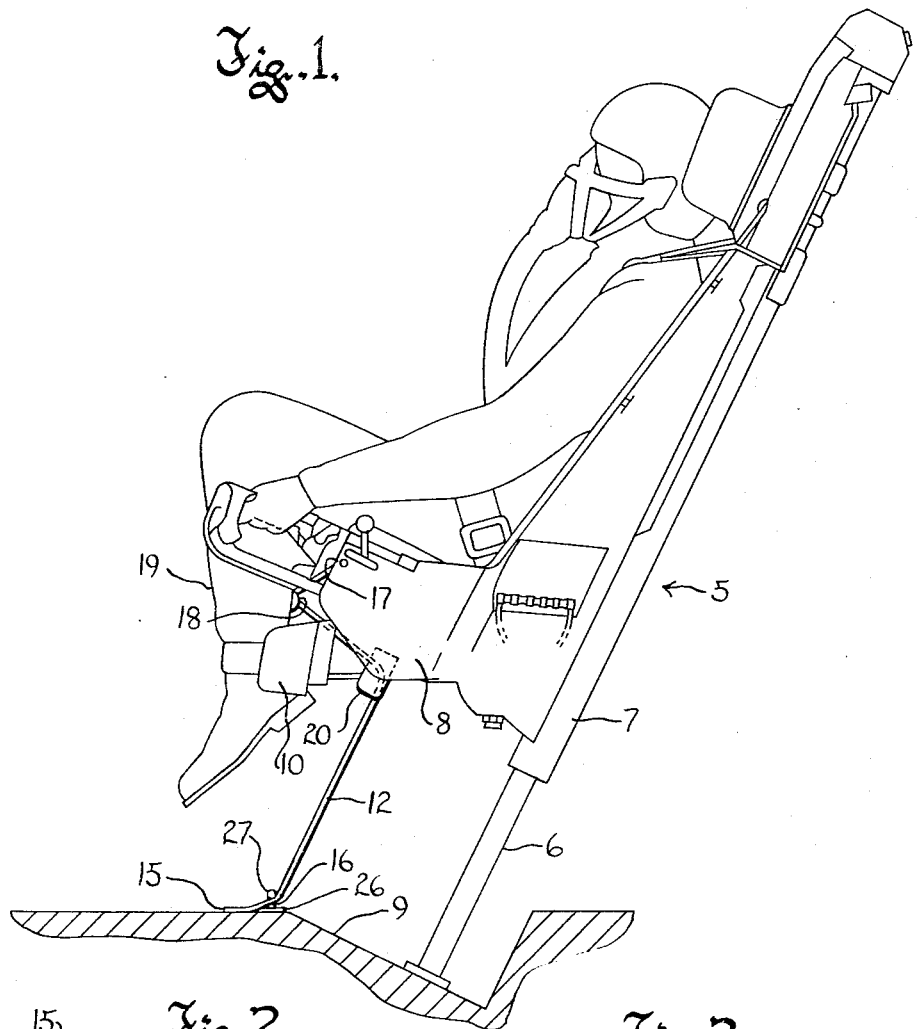
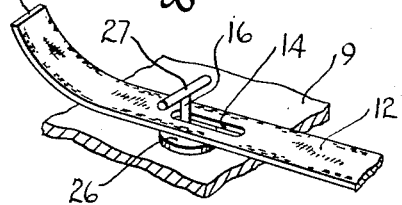
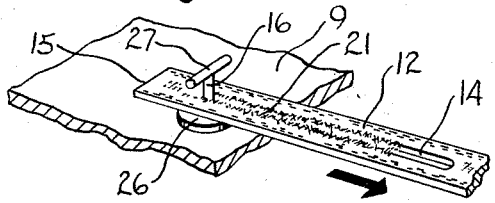
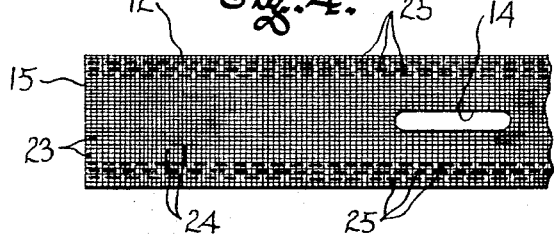

3,334,847
POSITIONING AND RESTRAINING MEANS
FOR EJECTION SEAT OCCUPANT
Carl Evert Axenborg, Linkoping, Sweden, assignor to
Saab Aktiebolag, Linkoping, Sweden, a corporation
of Sweden
Filed Dec. 16, 1965, Ser. No. 514,359
Claims priority, application Sweden, Dec. 23, 1964,
15,587/64
5 Claims. (Cl. 244—122)

This invention relates to aircraft ejection seats, and pertains more particularly to positioning and restraining apparatus by which the body members of an ejection seat occupant are forced into predetermined positions during an initial stage of seat ejection and are maintained in such positions during the remainder of ejection to insure that the seat occupant will be in the most favorable attitude to clear all portions of the aircraft structure and to withstand the acceleration and wind forces encountered during ejection.

During the initial stages of an airman's ejection from an aircraft by means of an ejection seat, the airman is subjected to very large acceleration forces, approaching the maximum that the human body can endure under favorable circumstances. Furthermore, as soon as the airman begins to emerge from the aircraft he is exposed to the forces of the relative wind, which can have extremely high values in the case of ejection from a very high speed aircraft.

Under these circumstances it is imperative that the limbs, torso and head of an ejection seat occupant all be confined, during ejection, in such positions and attitudes as will best enable him to withstand the tremendous and rapidly varying forces to which he is subjected, and also, of course, enable him to clear all parts of the aircraft structure.

Voluntary action of the airman cannot be relied upon to dispose his body members in their optimum positions for ejection, and therefore various positioning and restraining devices have been devised for forcing his body members into those positions and confining them therein. One such device is disclosed in Patent No. 3,074,669, to N. I. Bohlin, issued Jan. 22, 1963.

In common with other such devices, including that of the present invention, the apparatus of the Bohlin patent incorporates tension elements which are connected with the airman and ejectable seat part at one end and with fixed structure in the aircraft at the other end, so as to be pulled and actuated by motion of the ejecting seat and seat occupant relative to the aircraft. In the actuation of these tension elements the work required for moving the occupant's body members to their ejection positions is derived from the propulsion means that effects seat ejection.

When the seat has passed through a certain portion of its ejection motion, the connection between the tension elements and the relatively fixed aircraft structure is broken. However, the tension elements are trained through unidirectional clamping devices which are carried by the ejectable part of the seat structure and which permit the tension elements to be moved in the direction to bring the airman's body members to their desired positions but prevent motion of the tension elements in the opposite direction. Hence the clamping devices serve to restrain the airman even after the tension elements have become disconnected from the aircraft.

In all such positioning and restraining devices, the tension elements must normally have sufficient slack to allow for a substantial range of motion of the occupant's body members and allow the airman to engage in the usual flight activities. This slack must of course be taken up during the very first stage of ejection seat motion, and thereafter the restraining means should apply a powerful but steady pull upon the airman's body members in directions to bring them to their desired ejection positions.

It has heretofore been customary to connect the tension elements of the positioning and restraining device with the fixed structure of the aircraft through a shear pin that sheared when tension on the tension elements reached a predetermined value. Where a shear pin provided the only yield between the tension elements and the aircraft structure, the load upon the tension elements during the initial stages of seat ejection depended solely upon the reaction forces exerted by the airman's body members, and in all cases rose to an abrupt peak at the instant when the pin was sheared.

In the apparatus of the Bohlin patent a spring was connected in series with the tension elements and with the shear pin, and the loading of this spring during the interval preceding shearing of the pin caused more gradually rising tension forces to be applied to the tension elements during the period in which they were being actuated.

Whether or not a spring was present, however such prior positioning and restraining devices tended to exert a relatively weak force during the initial stages of their actuation and a maximum force at the instant when the pin was sheared. Because all actuation of the device had to take place while the seat travelled through only a small distance, there were many situations in which the work required for positioning the airman's body members could not be obtained with such prior devices. For example, due to mass loads on the airman's calves, his legs might be swinging forward at the time when the positioning and restraining device had to be moving them rearwardly. With a prior device not incorporating a spring, forces on the tension elements could, under these conditions, build up so rapidly that the pin was sheared before the airman's legs were moved to any substantial extent. When a spring was connected in series with the tensioning elements and the shear pin, the tension forces on said elements built up more gradually, and might not be great enough at first to overcome the mass forces on the airman's legs, but then, just as tension force was reaching values at which it was becoming effective, the pin would shear before sufficient work could be done to bring the airman's legs all the way to their desired positions.

The principal object of the present invention is to overcome the above discussed deficiencies of prior positioning and restraining apparatus for aircraft ejection seats; and hence it can be said to be a general object of this invention to provide such apparatus which, as compared with prior devices of the type, is more dependable in operation and is more positive but less abrupt in its positioning action, in that it is capable of applying a more nearly uniform positioning force to a seat occupant's body member through a longer period of time.

More specifically, it is an object of this invention to provide means in a positioning and restraining device of the character described for exerting a substantially constant and uniform positioning force upon the body members of an ejection seat occupant all during an initial stage of seat ejection in which his members are to be positioned for ejection, thereby insuring that sufficient work is available to effect the desired positioning of the airman's body members with a substantial margin of safety.

In general the objects of the invention are achieved by the provision of a strap element and a cooperating blunt tearing element, one of said elements being secured to fixed structure of an aircraft and the other being connected with the ejectable part of an ejection seat, the tearing element being normally disposed in a hole in the strap element and the two elements being so arranged with respect to one another and the ejection seat parts that the tearing element effects lengthwise tearing of the strap element all during a predetermined portion of seat ejection and thereby yieldingly produces a tension force in the strap element which is substantially uniform all during relative motion between the strap and tearing elements and which has a magnitude that depends upon the strength of the strap element and is thus predeterminable.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

FIGURE 1 is a view in side elevation of an aircraft jection seat incorporating a positioning and restraining device embodying the principles of this invention, the seat being illustrated in a position which it momentarily occupies during an initial stage of ejection;

FIGURE 2 is a fragmentary perspective view on a larger scale showing the strap and tearing elements of this invention in their normal condition;

FIGURE 3 is a view similar to FIGURE 2 but showing how the strap element is torn by the tearing element in the course of seat ejection; and FIGURE 4 is a fragmentary plan view of the strap.

Referring now more particularly to the accompanying drawings, the numeral 5 designates generally an aircraft ejection seat of the type comprising a substantially upright ejection gun consisting of normally telescoped inner and outer tubes 6 and 7, respectively, and a seat pan 8 which is attached to the outer tube 7. The inner tube 6 is secured at its lower end to relatively fixed structure 9 of an aircraft in which the seat is mounted. Upon ejection, pressure gases react between the tubes to thrust the outer tube upwardly off of the inner tube and thereby propel the seat pan 8 and its occupant out of the aircraft.

On the seat pan 8 are a pair of forwardly facing leg rests 10 that serve to define the optimum position of the seat occupant's legs during ejection; that is, the airman's legs must be brought rearwardly into engagement with the leg rests 10 during an initial stage of ejection and must be confined to engagement with the leg rests throughout the remainder of the ejection. It will be understood that the ejectable part of the seat mechanism may have suitable rests or the like for positioning other members of the airman's body, and that for purposes of illustration the present invention is described only with reference to means for positioning and restraining the seat occupant's legs.

For moving the seat occupant's legs rearwardly into engagement with the leg rests, it must be possible to impose upon them sufficient force to overcome any mass acceleration forces to which they may be subjected and any involuntary muscular effect that the airman may exert. For this purpose the positioning and restraining device includes a pair of tension elements 12, each so connected with the fixed structure 9 of the aircraft, the seat pan 8, and one of the seat occupant's legs that the airman's legs are drawn rearwardly in consequence of upward propulsion of the seat pan during an initial stage of seat ejection.

In general, each tension element 12 comprises a strap of woven fabric having reinforced side edges and having a hole 14 therein intermediate its side edges and spaced from one end 15 thereof. A blunt tearing element 16 is rigidly secured to the fixed structure 9 of the aircraft below the seat pan and normally projects through the hole 14 in the strap, as shown in FIGURES 1 and 2, to comprise the connection between the aircraft and the tension element.

The other end of each strap is anchored to the seat pan, as at 17; and the upper portion of the strap, between the anchorage 17 and the hole 14, is slidably trained through a loop connector 18 on the airman's flying suit or harness 19 and through a unidirectional clamp 20 that is fixed to the seat pan.

As the seat pan 8 begins to move upwardly during seat ejection, the blunt tearing element 16 resists lengthwise movement of the strap, thus tensioning it, but it tears a lengthwise rift 21 in the strap (see FIGURE 3) to provide for controlled yielding of the connection between the strap and the aircraft structure. It will be noted that the anchorage 17 of the strap, the connector loop 18 on the airman's harness and the unidirectional clamp 20 are arranged at the points of a triangle, the anchorage 17 being above and behind the loop 18 and the clamp 20 being below and behind it, all with respect to the position of the loop when the airman's legs are engaged with the leg rests. Hence the foreshortening of the upper portion of the strap in response to lengthwise tension on it moves the loop 18 back toward an imaginary line through the anchorage 17 and the clamp 20, thus forcing the airman's legs against the leg rests.

The clamp 20, which of course affords sliding guidance to the upper portion of the strap, also functions in a known manner to permit the strap to slide lengthwise downwardly but to prevent upward motion of it. Hence the clamp cooperates with the tension element 12 to confine the airman's legs against the leg rests 10 even after the lower end of the tension element has become detached from the aircraft structure.

The strap can be woven of any suitable textile fibre, with transverse threads 23 and longitudinal threads 24. The reinforcements along its side edges can comprise a plurality of lengthwise extending seams 25.

It is of course important that the strap be maintained in engagement with the tearing element until it has been torn all the way through its end 15, and therefore the tearing element should be operatively associated with fixed guide means which overlie opposite faces of the strap. As shown, these guide means consist of a boss 26 or the like on the fixed structure of the aircraft, from which the tearing element projects upwardly and which is slideably engaged by one face of the strap, and a cross-bar 27 fixed on the top of the tearing element, overlying the opposite face of the strap and spaced from the boss 26 by a distance somewhat greater than the thickness of the strap.

As the seat moves upwardly and tensions the strap, the transverse threads 23 of the strap are successively torn by the tearing element 16, so that the tearing element exerts a substantially constant reaction force on the strap all during the time that the rift 21 is being torn in the strap from its hole 14 to its end 15. The seams 25 of course confine the end portions of the lateral threads against displacement during this process, insuring that successive lateral threads along the strap will be tensioned to their breaking point in a uniform manner. The longitudinal threads 24 of the strap remain substantially undisturbed by the tearing process.

It will be noted that the reaction force upon the strap is determined by the strength of its transverse threads 23 and that the period during the ejection through which tensioning of the straps occurs is determined by the length of strap to be torn, i.e. the distance between the hole 14 and the end 15 of the strap. Thus the present invention provides for predetermination of both the magnitude and the duration of the positioning forces to be exerted on an airman's body members.

It will be apparent that the invention lends itself to numerous variations. For example, a single strap can be used to position several body members by connecting the upper end of the strap with a cable or the like for each body member in an arrangement which will be obvious to those skilled in the art in the light of the above mentioned Bohlin patent.

From the foregoing description taken together with the accompanying drawing it will be apparent that this invention provides a positioning and restraining device for an aircraft ejection seat occupant which, although simple and light in weight, is very positive and dependable in operation and is capable of positioning a seat occupant's body members smoothly and firmly without imposing abrupt forces upon them.

What is claimed as my invention is:

1. In an aircraft ejection seat having a stationary part adapted to remain fixed in an aircraft and an occupant carrying part adapted to be propelled along a defined path during ejection, means for utilizing motion of the occupant carrying part during an initial stage of ejection for applying to a member on one of said parts a force which is exerted in a predetermined direction and which has a magnitude that is substantially constant all during said stage of ejection, said means comprising:
   (A) an elongated strap element having reinforced longitudinal edge portions and having a hole therethrough intermediate its longitudinal edges and spaced from one of its ends;
   (B) a blunt tearing element normally projecting through said hole in the strap element and adapted to effect lengthwise tearing of the strap element upon exertion of a lengthwise pulling force upon the other end of the strap;
   (C) means connecting one of said elements with said member; and
   (D) means connecting the other element with the other ejection seat part;
       that one of said last two recited means which connects the strap element being at its said other end.

2. In an aircraft ejection seat having a stationary part adapted to remain in an aircraft and an occupant carrying part adapted to be propelled along a defined path during ejection, means for applying to a member of an occupant's body, throughout an initial stage of ejection, a force in a direction to dispose said body member in a desired attitude, and which force is of substantially uniform value all during the period that it is being applied, said force applying means comprising:
   (A) an elongated strap
       (1) having reinforced longitudinal edge portions and
       (2) having a hole intermediate its longitudinal edges and spaced a predetermined distance from one of its ends;
   (B) means near the other end of the strap for connecting the same with said member of an occupant body; and
   (C) a blunt tearing element fixed with respect to said stationary part and extending through said hole in the strap, for causing the strap to tear lengthwise when sufficient longitudinal force is applied to the strap from said other end thereof, so that by such tearing of the strap a reaction force is produced which yieldingly opposes motion of the strap in the direction toward its said other end.

3. The force applying means of claim 2, further characterized by the fact that said strap comprises:
   (A) woven fibre material having lengthwise extending threads and transversely extending threads; and
   (B) reinforcing seams along the longitudinal edge portions of the strap which confine the transversely extending threads at the longitudinal edge portions of the strap so that only the portions of the transversely extending threads between said seams are broken during tearing of the strap while the longitudinal threads remain substantially intact.

4. The force applying means of claim 2, further characterized by:
   confinement means fixed adjacent to said tearing element and extending transversely to the strap over its opposite faces to slideably engage the strap and prevent it from becoming disengaged from the tearing element while it is being torn.

5. The force applying means of claim 2, further characterized by:
   (A) guide means secured to said occupant carrying seat part and through which passes a portion of the strap between said hole therein and said connecting means, and whereby the pulling force upon the strap during ejection is caused to be exerted upon the occupant in said direction; and
   (B) unidirectional clamping means associated with said guide means for permitting the strap to move lengthwise in the direction toward its first designated end and for preventing it from moving in the opposite direction.

References Cited

UNITED STATES PATENTS 2,955,786  10/1960  Drew et al. _____ 244—122

MILTON BUCHLER, *Primary Examiner.*

B. BELKIN, *Assistant Examiner.*